United States Patent
Hansen

(10) Patent No.: US 6,854,194 B2
(45) Date of Patent: Feb. 15, 2005

(54) WHEEL CENTERING ADAPTOR WITH PROTECTIVE LINER AND WEAR INDICATOR

(76) Inventor: Allan H. Hansen, 19126 Double Eagle Dr., Cornelius, NC (US) 28031

(*) Notice: Subject to any disclaimer, the term of this patent is extended or adjusted under 35 U.S.C. 154(b) by 0 days.

(21) Appl. No.: 10/441,869

(22) Filed: May 20, 2003

(65) Prior Publication Data

US 2004/0211075 A1 Oct. 28, 2004

Related U.S. Application Data

(60) Provisional application No. 60/464,887, filed on Apr. 23, 2003.

(51) Int. Cl.[7] .............................................. G01D 21/00
(52) U.S. Cl. ....................... 33/520; 33/203.18; 116/208; 73/487; 157/14; 403/1; 403/27
(58) Field of Search .......................... 33/520, 644, 203, 33/203.18, 600, 609–610; 116/208; 73/487; 157/14, 20–21; 403/1, 27, 373, 374.1–374.4

(56) References Cited

U.S. PATENT DOCUMENTS

| | | | |
|---|---|---|---|
| 3,667,299 A | 6/1972 | Roberts | |
| 3,776,651 A * | 12/1973 | Peter et al. ................. | 403/248 |
| 3,889,542 A | 6/1975 | Carrigan | |
| 4,097,167 A * | 6/1978 | Stratienko ................. | 403/374.4 |
| 4,188,828 A | 2/1980 | Cuccolini | |
| 4,332,169 A | 6/1982 | Stuart | |
| 4,433,578 A | 2/1984 | Hill | |
| 4,462,253 A | 7/1984 | Becher | |
| 4,478,081 A | 10/1984 | Greene | |
| 4,699,431 A | 10/1987 | Daberkoe | |
| 4,919,674 A * | 4/1990 | Schelhas ................... | 623/22.29 |
| 5,559,307 A * | 9/1996 | Whitehead et al. ........... | 174/87 |
| 5,713,169 A * | 2/1998 | Meier et al. ............. | 52/223.13 |
| 5,948,980 A | 9/1999 | Rossteuscher | |
| 5,987,761 A | 11/1999 | Ohnesorge | |
| 6,059,378 A | 5/2000 | Dougherty et al. | |
| 6,338,273 B1 | 1/2002 | Warkotsch | |
| 6,481,281 B1 | 11/2002 | Gerdes | |
| 6,684,585 B2 * | 2/2004 | Campbell ................. | 52/223.13 |
| 2003/0094125 A1 * | 5/2003 | Hsueh ........................ | 116/208 |

* cited by examiner

*Primary Examiner*—Diego Gutierrez
*Assistant Examiner*—Tania Courson
(74) *Attorney, Agent, or Firm*—Schwartz Law Firm P.C.

(57) ABSTRACT

A wheel centering adapter for being applied to an elongated mounting shaft designed for extending through a center hole of a vehicle wheel. The centering adapter cooperates with a clamping assembly to align and center the wheel relative to the shaft. The centering adapter includes an adapter body defining a cylindrical through-bore designed to receive the mounting shaft. A protective liner is formed adjacent the through-bore of the adapter body and has a non-abrasive surface for protecting the mounting shaft from wear upon application and removal of the centering adapter.

20 Claims, 9 Drawing Sheets

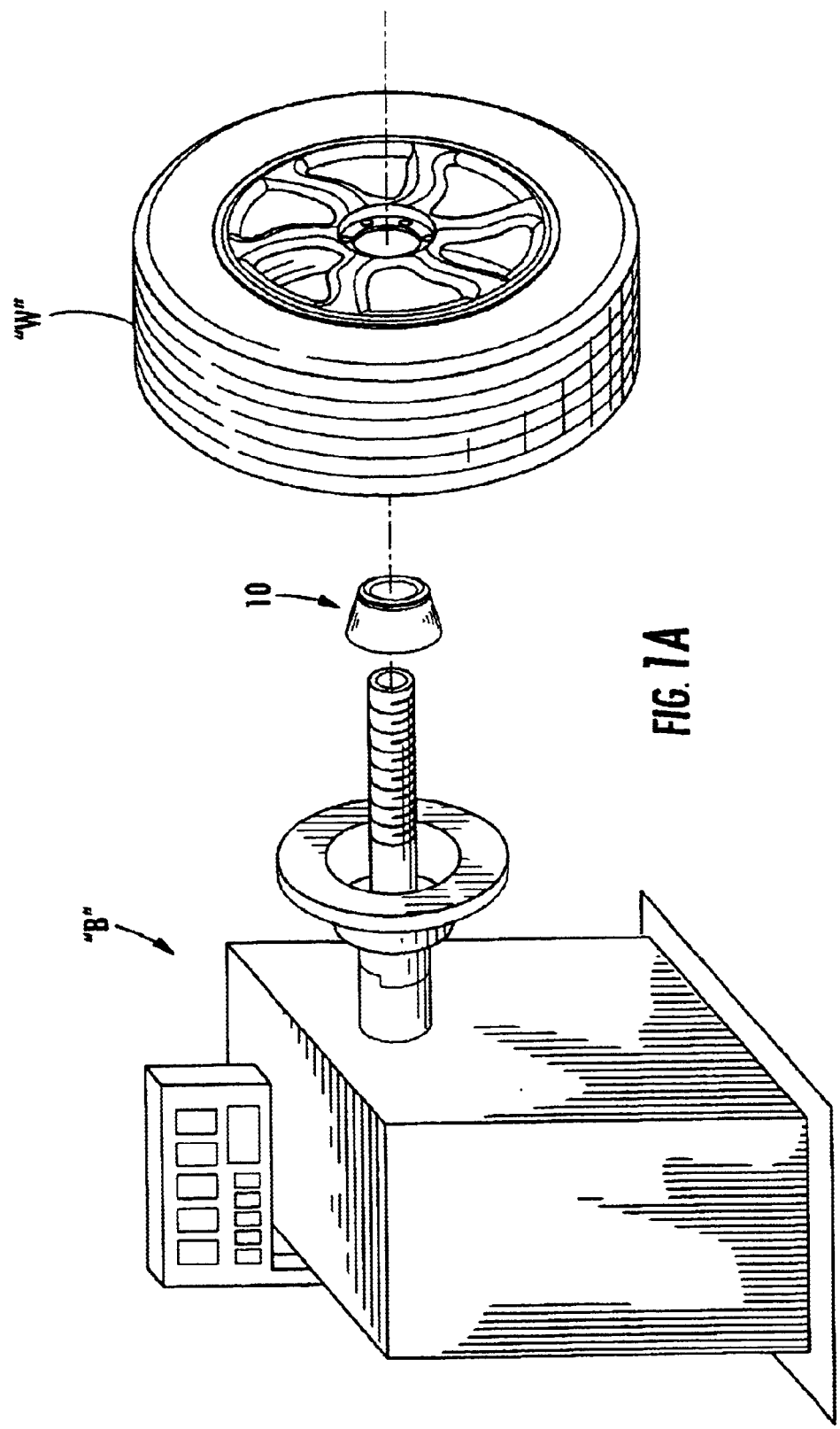

WHEEL CENTERING ADAPTOR WITH PROTECTIVE LINER AND WEAR INDICATOR

TECHNICAL FIELD AND BACKGROUND OF THE INVENTION

This invention relates to a wheel centering adapter with a protective inside liner and visual wear indicator. The invention is especially designed for use on a horizontal steel mounting shaft adapted for extending through the center hole of a vehicle wheel, and incorporated in an off-vehicle spin balancer applicable for balancing the wheel. The invention operates to statically center the vehicle wheel relative to an axis defined by the mounting shaft. The protective inside liner is preferably formed of a non-abrasive, molded polymer which will not damage or wear the steel shaft. Alternatively, the protective liner may be formed of Teflon or a carbon graphite composite. The invention has a variety of applications including centering cones, centering sleeves, centering disks and centering collets for off-vehicle wheel servicing machines. In addition to spin balancers, the invention is applicable for wheel centering on off-vehicle brake lathes.

Centering adapters, such as cones and sleeves, are generally formed in multiple shapes and sizes designed to accommodate a variety of different wheels. A typical service facility may carry several adapters sized to cover wheel holes ranging from 42 mm to 133 mm in diameter. Over the course of a day, many adapters will be applied to and removed from the mounting shaft of the servicing machine. The centering adapter cooperates with suitable clamping elements, such as a standard flange plate and wingnut tightener, to lift and statically center the vehicle wheel on the shaft. Traditionally, the centering adapter has been formed entirely of steel or other hard metal suitable for engaging and properly centering the wheel. Repeated application and removal of the adapters causes the expensive steel shaft to wear over time. When the shaft becomes worn or damaged even slightly, the vehicle wheel cannot be accurately centered and will result in a static out-of-balance condition. While centering adapters are less expensive and replaceable when worn, most service facilities do not monitor and properly maintain the condition of the mounting shaft and are reluctant to replace it when worn.

SUMMARY OF INVENTION

Therefore, it is an object of the invention to provide a wheel centering adapter which has a protective inside liner and visual wear indicator.

It is another object of the invention to provide a wheel centering adapter which will not damage or wear down the steel shaft of a wheel servicing machine, such that the diameter of the shaft remains precisely consistent over time.

It is another object of the invention to protect the mounting shaft of a wheel servicing machine from damage and wear.

It is another object of the invention to improve the static centering of vehicle wheels on the mounting shaft of a wheel servicing machine.

These and other objects of the present invention are achieved in the preferred embodiments disclosed below by providing a wheel centering adapter for being applied to an elongated mounting shaft designed for extending through a center hole of a vehicle wheel. The centering adapter cooperates with clamping means to align and center the wheel relative to the shaft. The centering adapter includes an adapter body defining a cylindrical through-bore designed to receive the mounting shaft. A protective liner is formed adjacent the through-bore of the adapter body and has a non-abrasive surface for protecting the mounting shaft from wear upon application and removal of the centering adapter.

The term "non-abrasive" surface refers to any surface which is less abrasive than metal. Upon application of the present invention, the steel mounting shaft of the wheel servicing machine will not wear or be damaged due to repeated application and removal of the centering adapter.

According to another preferred embodiment of the invention, the protective liner is formed separately from the adapter body.

According to another preferred embodiment of the invention, the protective liner is formed of an integrally molded polymer.

According to another preferred embodiment of the invention, the adapter body is formed of metal.

According to another preferred embodiment of the invention, means are provided for securing the protective liner to the metal adapter body.

According to another preferred embodiment of the invention, the means for securing the protective liner includes opposing annular beveled edges formed at respective opposite ends of the through-bore and engaging complementary outwardly flared ends of the protective liner.

According to another preferred embodiment of the invention, the adapter body is a centering cone.

According to another preferred embodiment of the invention, the adapter body is a centering disc.

According to another preferred embodiment of the invention, the adapter body is a centering sleeve.

According to another preferred embodiment of the invention, the adapter body comprises a centering collet.

In yet another embodiment, the invention is a wheel centering adapter for being applied to an elongated mounting shaft designed for extending through a center hole of a vehicle wheel. The centering adapter cooperates with clamping means to align and center the wheel relative to the shaft. The centering adapter includes an adapter body defining a cylindrical through-bore designed to receive the mounting shaft. A protective liner is formed adjacent the through-bore of the adapter body. The protective liner has an non-abrasive surface for protecting the mounting shaft from wear upon application and removal of the centering adapter. A visual wear indicator is formed with the protective liner, and is adapted for readily indicating a worn condition of the liner.

DESCRIPTION OF THE DRAWINGS

Some of the objects of the invention have been set forth above. Other objects and advantages of the invention will appear as the description proceeds when taken in conjunction with the following drawings, in which:

FIG. 1A is a perspective view of a vehicle spin balancer with the centering adapter and vehicle wheel exploded away from the mounting shaft of the mid-centering device;

DESCRIPTION OF THE PREFERRED EMBODIMENT AND BEST MODE

Figure 1:
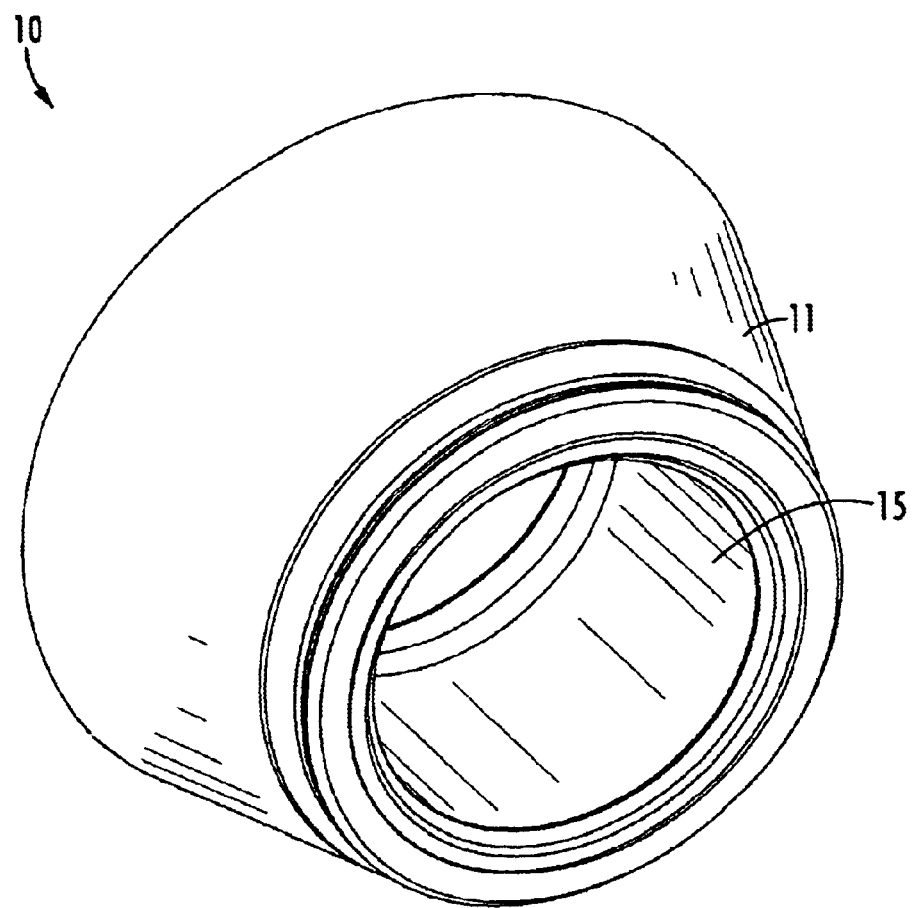
FIG. 1 is a perspective view of a wheel centering adapter according to one preferred embodiment of the invention.
Figure 2:
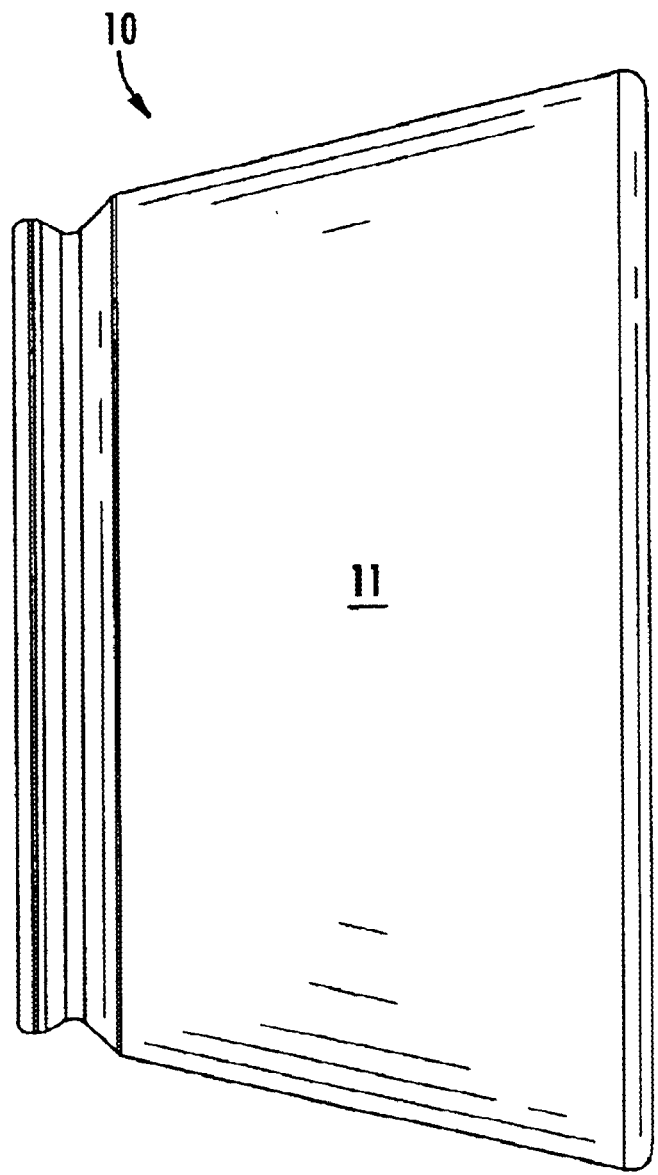
FIG. 2 is a side elevation of the centering adapter shown in FIG. 1.
Figure 3:
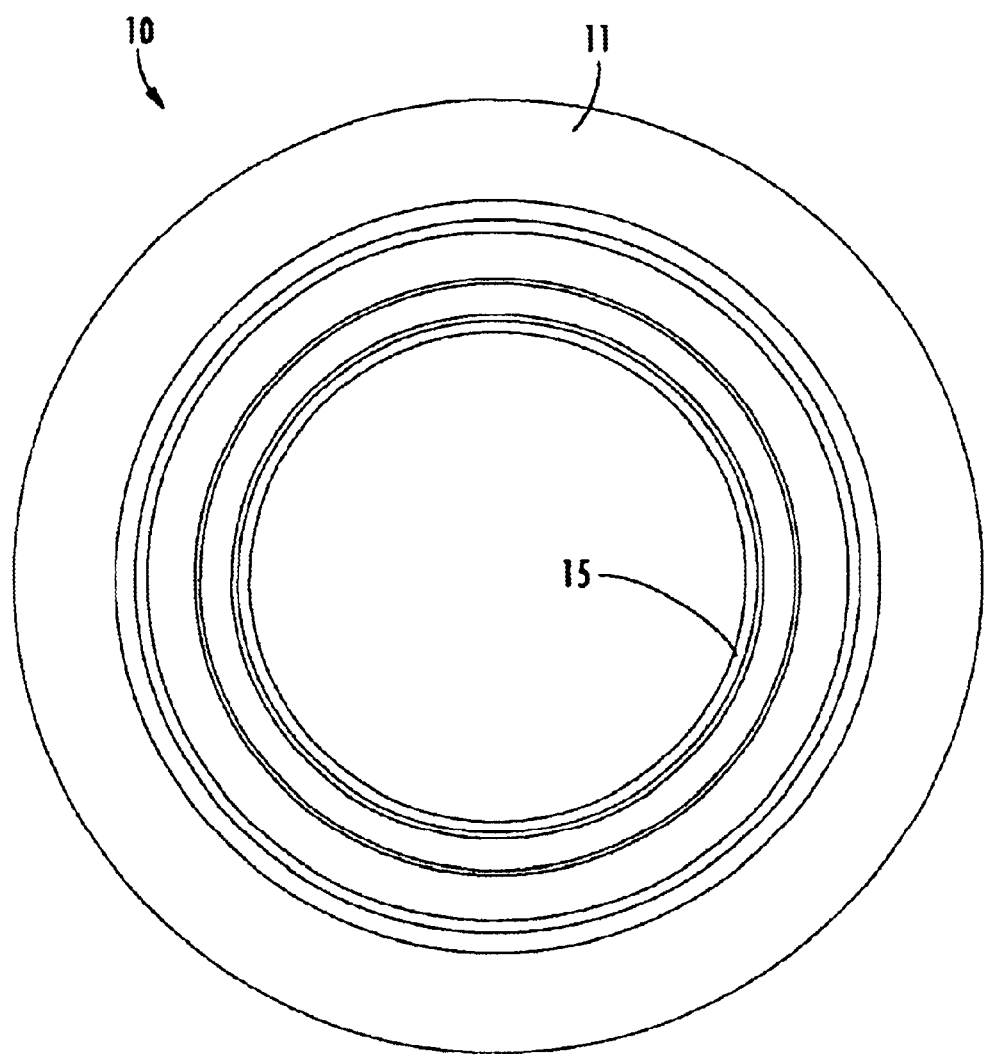
FIG. 3 is a view showing one end of the centering adapter.
Figure 4:
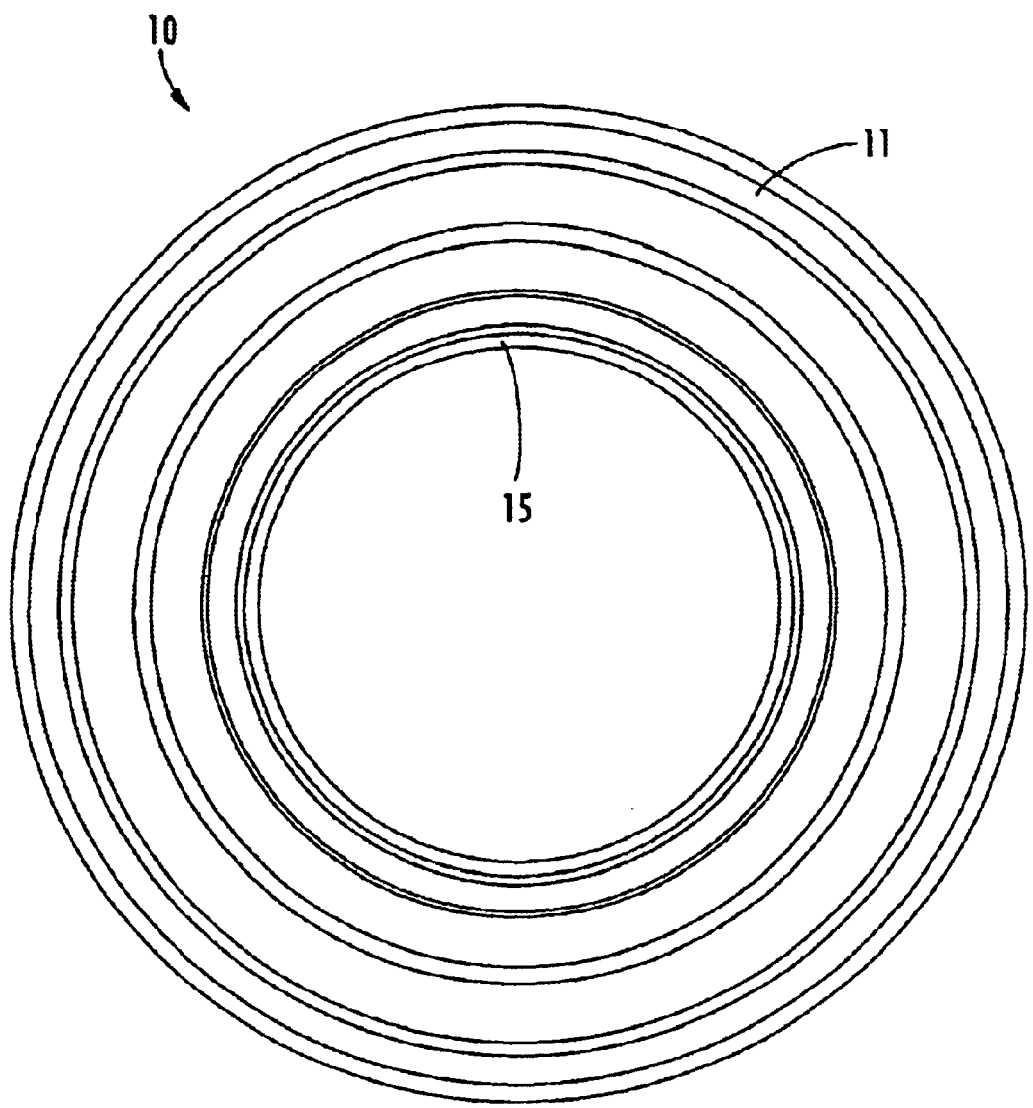
FIG. 4 is a view showing an opposite end of the centering adapter.

Referring now specifically to the drawings, a wheel centering adapter according to the present invention is illustrated in FIG. 1, and shown generally at reference numeral 10. As shown in FIG. 1A, the centering adapter 10 is especially applicable for use in an off-vehicle spin balancer "B" adapted for balancing a vehicle wheel "W". The spin balancer incorporates a mid-centering device including a horizontal steel mounting shaft which extends through a center hole of the wheel, and a face plate against which the wheel is torqued prior to balancing. The centering adapter 10 is carried on the steel shaft, and resides between the face plate and vehicle wheel. As the wheel is tightened against the face plate, the centering adapter 10 operates to lift and statically center the wheel relative to the shaft.

Figure 5:
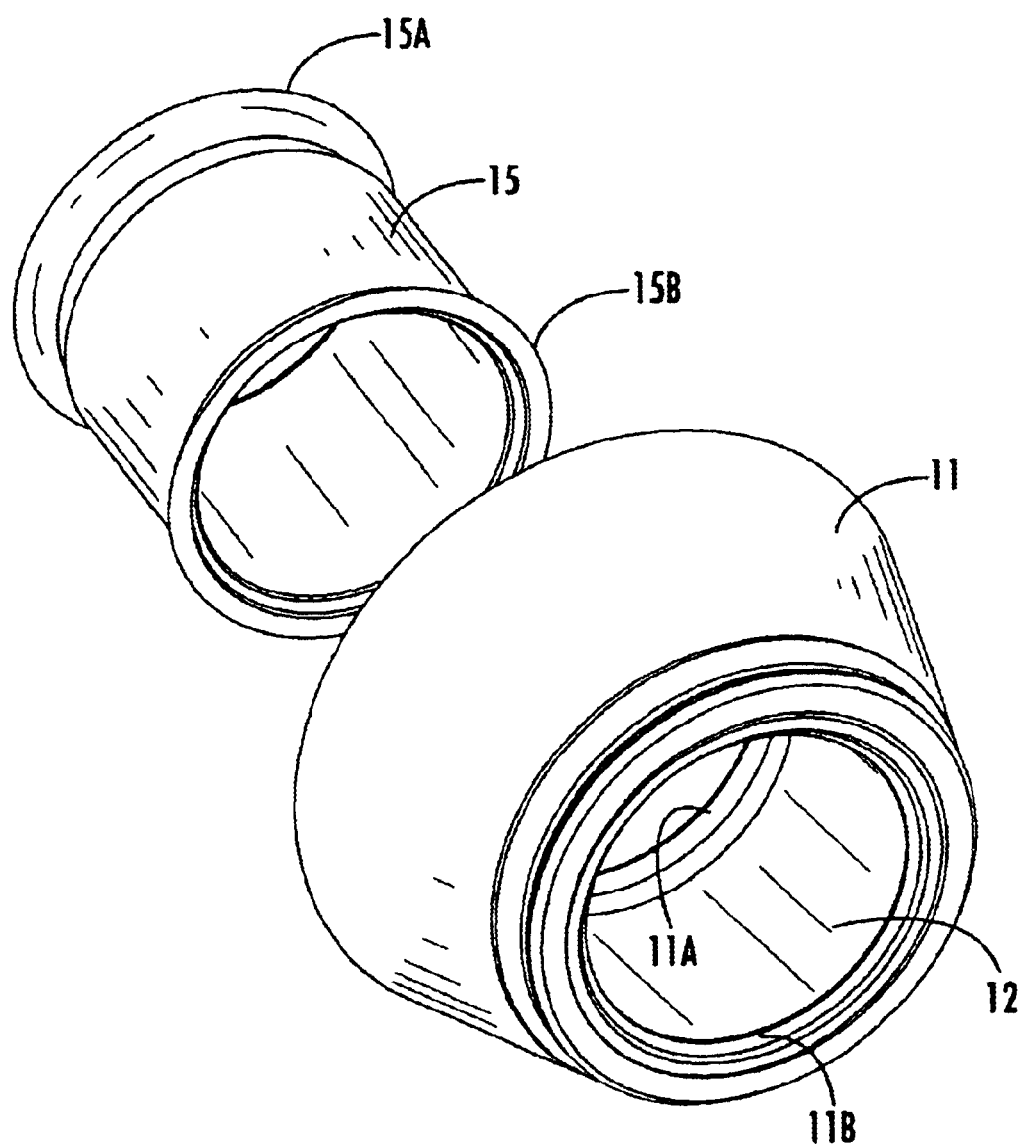
FIG. 5 is a perspective view of the centering adapter showing the adapter body and molded protective liner exploded away.
Figure 6:
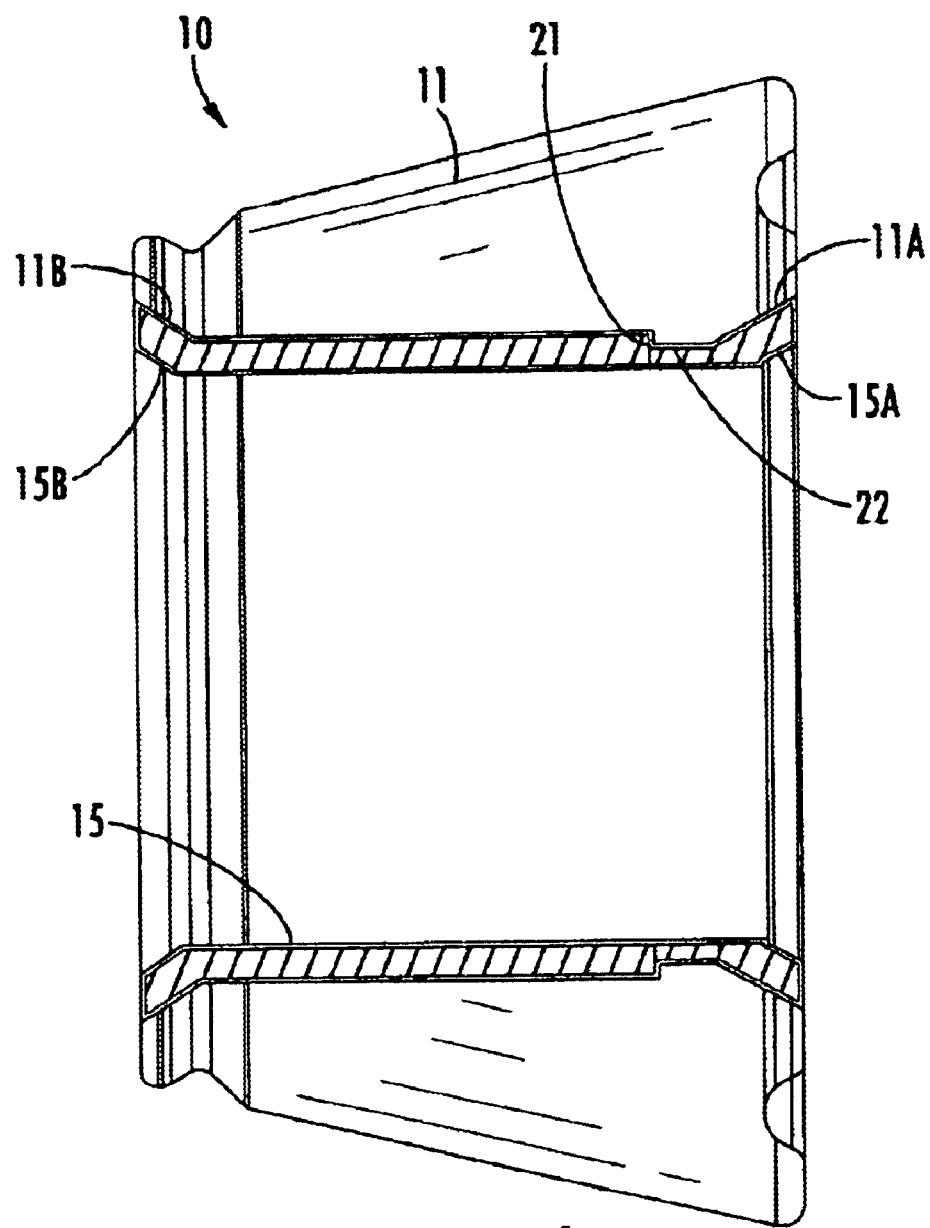
FIG. 6 is a cross-sectional view of the centering adapter.

In the embodiment of FIGS. 1–6, the centering adapter 10 includes a solid, hard metal, low-angle cone 11 and cylindrical through-bore 12 (See FIG. 5) designed to closely receive the steel shaft of the mid-centering device. A separately formed protective liner 15 is located adjacent the through-bore 12 and has a relatively slick, non-abrasive exterior surface which contacts the steel shaft and protects the shaft from wear upon repeated application and removal of the adapter 10. The liner 15 is preferably integrally-molded of a polymeric material directly inside the metal cone 11 using a suitable form. As best shown in FIGS. 5 and 6, the opposing annular ends 15A, 15B of the molded liner 15 are flared outwardly to engage complementary beveled ends 11A, 11B of the cone 11. The ends 15A, 15B and 11A, 11B cooperate to lock the molded liner 15 and cone 11 together. Alternatively, the liner 15 may be formed of a carbon graphite composite, or may comprise a Teflon coating covering the entire inside cylindrical surface of the adapter 10.

As shown in FIG. 6, a raised annular shoulder 21 is integrally-formed with the interior of the cone 11 and defines a constricted metal ring 22 in an area of reduced polymer thickness. The metal ring 22 provides a visual wear indicator which readily shows through the polymer when the protective liner 15 becomes worn. Quick and convenient inspection of the centering adapter 10 in an area of the wear-indicating ring 22 alerts the operator as to when the adapter 10 should be replaced. Timely replacement of the adapter 10 prevents damaging metal-to-metal contact between the adapter 10 and shaft.

Figure 7:
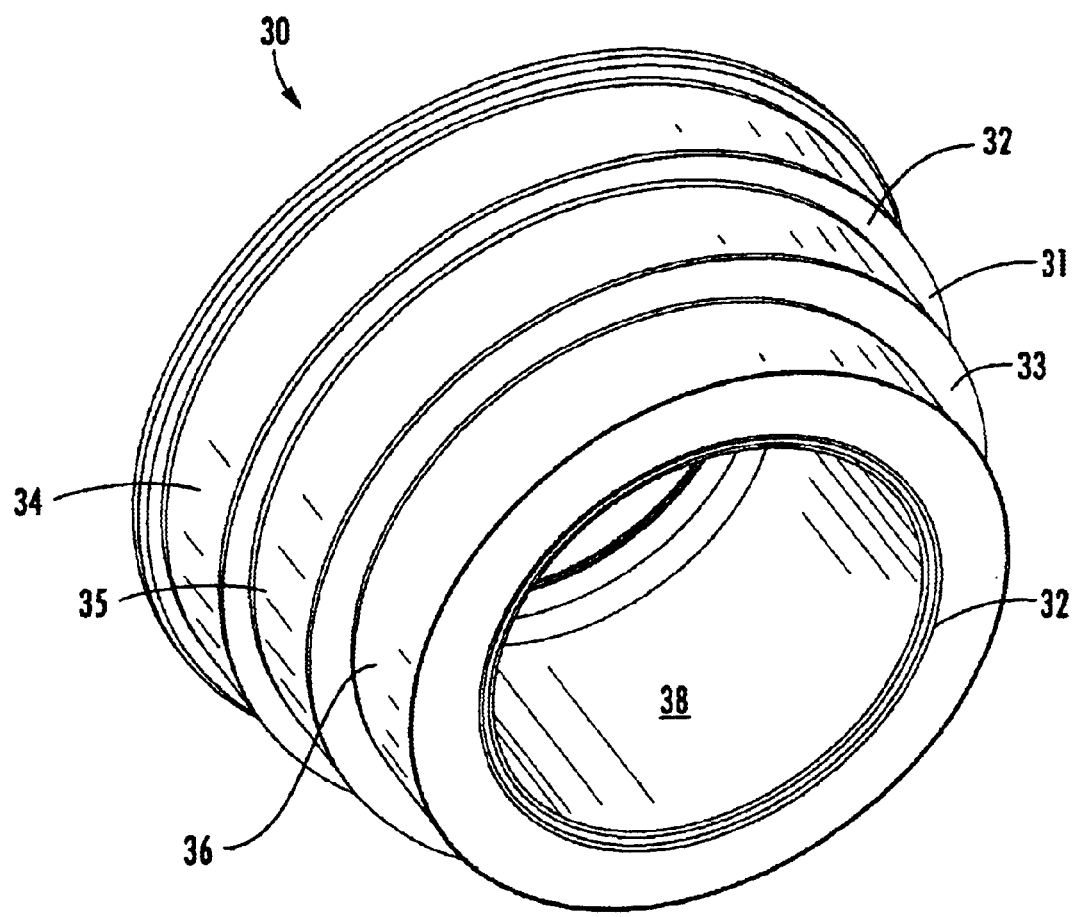
FIG. 7 is a perspective view of a centering adapter according to another preferred embodiment of the invention.
Figure 8:
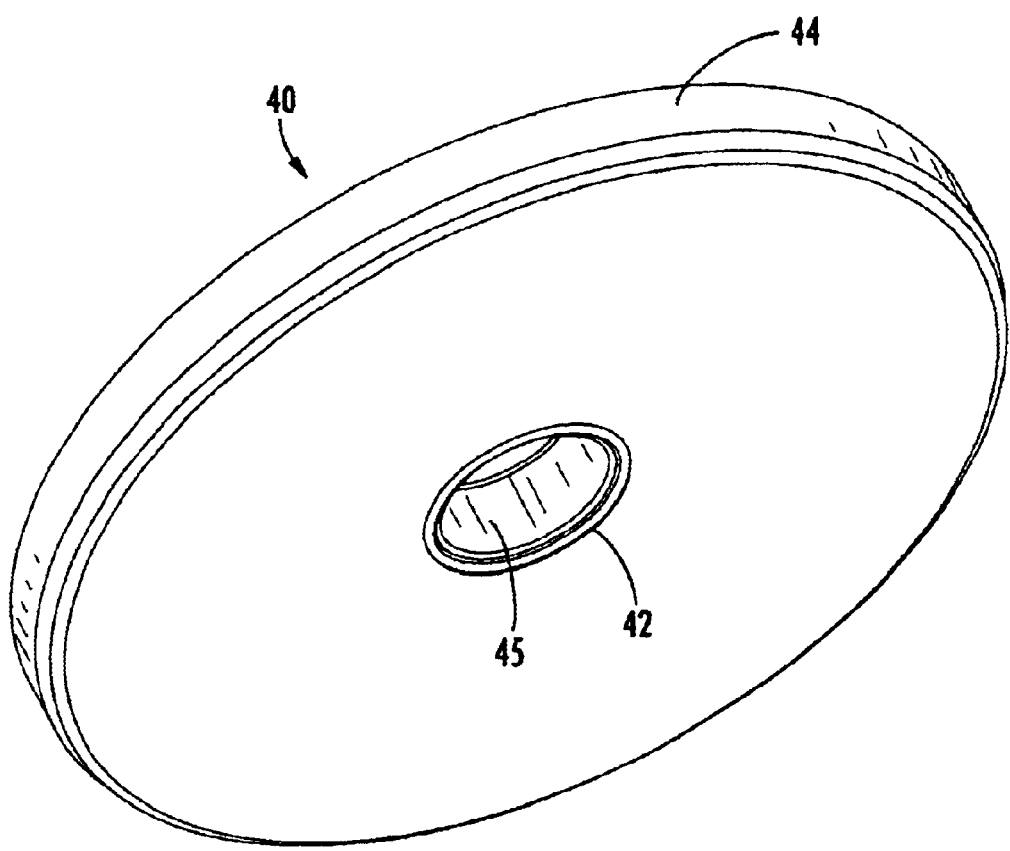
FIG. 8 is a perspective view of a centering adapter according to a third preferred embodiment of the invention.

Further embodiments of centering adapters according to the present invention are illustrated in FIGS. 7 and 8, respectively. The adapter 30 includes a solid hard metal graduated sleeve 31 and cylindrical through-bore 32 designed to closely receive the steel shaft of the mid-centering device. The sleeve 31 has a number of steps 32 and 33 which form respective low-angle cone portions 34, 35, and 36 of different sizes. A separately formed protective liner 38 is located adjacent the through-bore 32 and has a relatively slick, non-abrasive exterior surface which contacts the steel shaft of the mid-centering device and protects the shaft from wear upon repeated application and removal of the adapter 30. The liner 38 is preferably integrally-molded of a polymeric material directly inside the metal sleeve 31 using a suitable form.

The centering adapter 40, shown in FIG. 8, includes a solid hard metal disc 41 and cylindrical through-bore 42 designed to closely receive the steel shaft of the mid-centering device. A separately formed protective liner 45 is located adjacent the through-bore 42 and has a relatively slick, non-abrasive exterior surface which contacts the steel shaft and protects the shaft from wear upon repeated application and removal of the adapter 40. Like protective liners 15 and 38, described above, the liner 45 is integrally-molded of a polymeric material directly inside the metal disc 41 using a suitable form.

A wheel centering adapter is described above. Various details of the invention may be changed without departing from its scope. Furthermore, the foregoing description of the preferred embodiment of the invention and best mode for practicing the invention are provided for the purpose of illustration only and not for the purpose of limitation—the invention being defined by the claims.

I claim:

1. In combination with a wheel servicing machine comprising an elongated mounting shaft designed for extending through a center hole of a vehicle wheel, a wheel centering adapter applied to the elongated mounting shaft to align and center the wheel relative to the shaft, said centering adapter comprising:

(a) an adapter body defining a cylindrical through-bore designed to receive the mounting shaft; and (b) a protective liner formed adjacent the through-bore of said adapter body and comprising a non-abrasive surface for protecting the mounting shaft from wear upon application and removal of said centering adapter.

2. A wheel centering adapter according to claim 1, wherein said protective liner is formed separately from said adapter body.

3. A wheel centering adapter according to claim 2, wherein said protective liner is formed of an integrally molded polymer.

4. A wheel centering adapter according to claim 3, wherein said adapter body is formed of metal.

5. A wheel centering adapter according to claim 4, and comprising means for securing the protective liner to the metal adapter body.

6. A wheel centering adapter according to claim 5, wherein said means for securing the protective liner comprises opposing annular beveled edges formed at respective opposite ends of said through-bore and engaging complementary outwardly flared ends of the protective liner.

7. A wheel centering adapter according to claim 1, wherein said adapter body comprises a centering cone.

8. A wheel centering adapter according to claim 1, wherein said adapter body comprises a centering disc.

9. A wheel centering adapter according to claim 1, wherein said adapter body comprises a centering sleeve.

10. A wheel centering adapter according to claim 1, wherein said adapter body comprises a centering collet.

11. In combination with a wheel servicing machine comprising an elongated mounting shaft designed for extending through a center hole of a vehicle wheel, a wheel centering adapter applied to the elongated mounting shaft to align and center the wheel relative to the shaft, said centering adapter comprising:

(a) an adapter body defining a cylindrical through-bore designed to receive the mounting shaft;

(b) a protective liner formed adjacent the through-bore of said adapter body and comprising a non-abrasive surface for protecting the mounting shaft from wear upon application and removal of said centering adapter; and (c) a visual wear indicator formed with said protective liner and adapted for readily indicating a worn condition of said liner.

12. A wheel centering adapter according to claim 11, wherein said protective liner is formed separately from said adapter body.

13. A wheel centering adapter according to claim 12, wherein said protective liner is formed of an integrally molded polymer.

14. A wheel centering adapter according to claim 13, wherein said adapter body is formed of metal.

15. A wheel centering adapter according to claim 14, and comprising means for securing the polymer protective liner to the metal adapter body.

16. A wheel centering adapter according to claim 15, wherein said means for securing the protective liner comprises opposing annular beveled edges formed at respective opposite ends of said through-bore and engaging complementary outwardly flared ends of the protective liner.

17. A wheel centering adapter according to claim 11, wherein said adapter body comprises a centering cone.

18. A wheel centering adapter according to claim 11, wherein said adapter body comprises a centering disc.

19. A wheel centering adapter according to claim 11, wherein said adapter body comprises a centering sleeve.

20. A wheel centering adapter according to claim 11, wherein said adapter body comprises a centering collet.

* * * * *